(12) United States Patent
Davies et al.

(10) Patent No.: US 10,409,682 B1
(45) Date of Patent: Sep. 10, 2019

(54) DISTRIBUTED RAID SYSTEM

(71) Applicant: Seagate Technology LLC, Cupertino, CA (US)

(72) Inventors: Ian Davies, Longmont, CO (US); Ruiling Luo, Louisville, CO (US); Thomas George Wicklund, Longmont, CO (US); Kenneth F. Day, Tucson, AZ (US); Douglas William Dewey, Longmont, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 180 days.

(21) Appl. No.: 15/441,697

(22) Filed: Feb. 24, 2017

(51) Int. Cl.
*G06F 11/00* (2006.01)
*G06F 11/10* (2006.01)

(52) U.S. Cl.
CPC ...... *G06F 11/1092* (2013.01); *G06F 11/1084* (2013.01)

(58) Field of Classification Search
CPC ...... G06F 3/067; G06F 3/0683; G06F 3/0685; G06F 3/0688; G06F 3/0689; G06F 11/1084; G06F 11/1092
See application file for complete search history.

(56) References Cited

U.S. PATENT DOCUMENTS

| | | | | |
|---|---|---|---|---|
| 5,524,204 A * | 6/1996 | Verdoorn, Jr. | ...... | G06F 11/1096 711/114 |
| 6,516,425 B1 * | 2/2003 | Belhadj | ...... | G06F 11/1092 714/15 |
| 7,305,579 B2 | 12/2007 | Williams | | |
| 8,656,131 B2 * | 2/2014 | Wicklund | ...... | G06F 3/0617 711/114 |
| 9,389,975 B2 * | 7/2016 | Arakawa | ...... | G06F 11/1088 |
| 9,841,908 B1 * | 12/2017 | Zhao | ...... | G06F 3/0611 |
| 2003/0145167 A1 * | 7/2003 | Tomita | ...... | G06F 3/0608 711/114 |
| 2005/0182992 A1 * | 8/2005 | Land | ...... | G06F 3/0607 714/701 |
| 2009/0228648 A1 | 9/2009 | Wack | | |
| 2011/0029711 A1 | 2/2011 | Dhuse et al. | | |
| 2013/0013961 A1 | 1/2013 | Gladwin et al. | | |
| 2013/0054891 A1 | 2/2013 | Kawaguchi | | |
| 2013/0145091 A1 * | 6/2013 | Klemm | ...... | G06F 11/1076 711/114 |
| 2013/0238932 A1 | 9/2013 | Resch | | |

(Continued)

OTHER PUBLICATIONS

Anonymous, "RAID Array Expansion", retrieved from ip.com, Sep. 23, 2014, 10 pages. (Year: 2014).*

*Primary Examiner* — Michael Maskulinski
(74) *Attorney, Agent, or Firm* — Holzer Patel Drennan

(57) ABSTRACT

The technology disclosed herein includes a method for dividing a body of user data into a plurality of data blocks, and writing the plurality of data blocks into chunk zones in parallel streams, the chunk zones located in a first ordered pool of storage devices. In some implementations, the method includes adding additional storage devices to the first ordered pool making a second ordered pool, including the first ordered pool, and writing the plurality of data blocks across the second ordered pool of storage devices, such that each of the storage devices including spare capacity. The method includes determining if a storage device fails, and seeking data for the data blocks on the failed storage device from of the other storage devices.

20 Claims, 8 Drawing Sheets

(56) References Cited

U.S. PATENT DOCUMENTS

| | | | |
|---|---|---|---|
| 2013/0289383 A1 | 10/2013 | Flynn et al. | |
| 2014/0365819 A1* | 12/2014 | Cooper | G06F 11/1092 714/6.22 |
| 2015/0220398 A1* | 8/2015 | Schirripa | G06F 11/1469 707/675 |
| 2016/0034370 A1* | 2/2016 | Nanduri | G06F 11/1092 714/6.22 |
| 2017/0220282 A1* | 8/2017 | Dambal | G06F 3/0631 |

* cited by examiner

US 10,409,682 B1

DISTRIBUTED RAID SYSTEM

SUMMARY

In one implementation, the disclosed technology provides for a method for dividing a body of user data into a plurality of data blocks, and writing the plurality of data blocks into chunk zones in parallel streams, the chunk zones located in an ordered pool of storage devices. In some implementations, the method includes adding additional storage devices to the ordered pool, and writing the plurality of data blocks across the ordered pool of storage devices, each of the storage devices including spare capacity. The method includes determining if a storage device fails, and reconstructing data for data blocks on the failed storage device from of the other storage devices. In some implementations, the method includes rebuilding the data from the data blocks on the failed storage device in the spare capacity of the other storage devices. In some implementations, the method includes a partial rebuild.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following, more particular written Detailed Description of various implementations as further illustrated in the accompanying drawings and defined in the appended claims.

BRIEF DESCRIPTIONS OF THE DRAWINGS

The described technology is best understood from the following Detailed Description describing various implementations read in connection with the accompanying drawings.

DETAILED DESCRIPTIONS

Data redundancy techniques can be employed in data storage systems to enhance the ability of a user to recover previously stored data. One commonly employed technique is the use of RAID (redundant array of independent discs). A RAID array allows a particular data set to be stored across multiple data storage devices (e.g., hard disk drives), such as through data mirroring (RAID-1), data striping with parity (RAID-5), etc. Other, non-RAID based data redundancy techniques can be used as well, such as by making periodic backup copies of a data set on a separate memory (e.g., a backup disc, tape, remote storage, etc.).

While operable, the use of conventional data redundancy techniques to rebuild a data set can be time and resource intensive. For example, using parity codes to reconstruct all of the data from a failed device in a RAID set is time consuming because it depends on regenerating data from each missing drive on a corresponding spare drive. Rebuild speed is then limited by the speed by which a single drive can be written. Similarly, locating and accessing a backup copy of a data set can be inconvenient and may not provide the most recent copy of the data set if updates were made to the data set after the most recent backup operation.

Accordingly, various embodiments disclosed herein are generally directed to reducing the time and effort required to rebuild a data set from a storage device. According to one implementation, the disclosed technology provides for using distributed RAID to virtualize disks into a single large virtual pool using large fixed chunk zones on storage devices. Chunk zones may be defined as segments of device storage that hold chunks of data from stripes.

Volumes may be virtualized out of virtual pools in the same manner as traditional RAID arrays (e.g., vdisks). However, instead of mapping the stripes of a RAID array individually or mapping a single RAID stripe over the disk pool as in a distributed RAID, a large, fixed number of RAID stripes are configured together forming a "stripe zone." For a single stripe zone, the RAID stripes are consistently laid out over physical disks in the same manner as traditional RAID. The stripe zones (instead of the individual RAID stripes) are the unit that may be scattered over the large pool of disks.

As a result, the disclosed technology provides a way to implement RAID for fast rebuilds and addresses the major performance problem of traditional distributed RAID solutions, that is sequential I/O performance, and more specifically, sequential write performance. The disclosed technology also provides a way to handle partial failures without failing the entire device, and allows devices of non-standard and different capacities.

Figure 1:
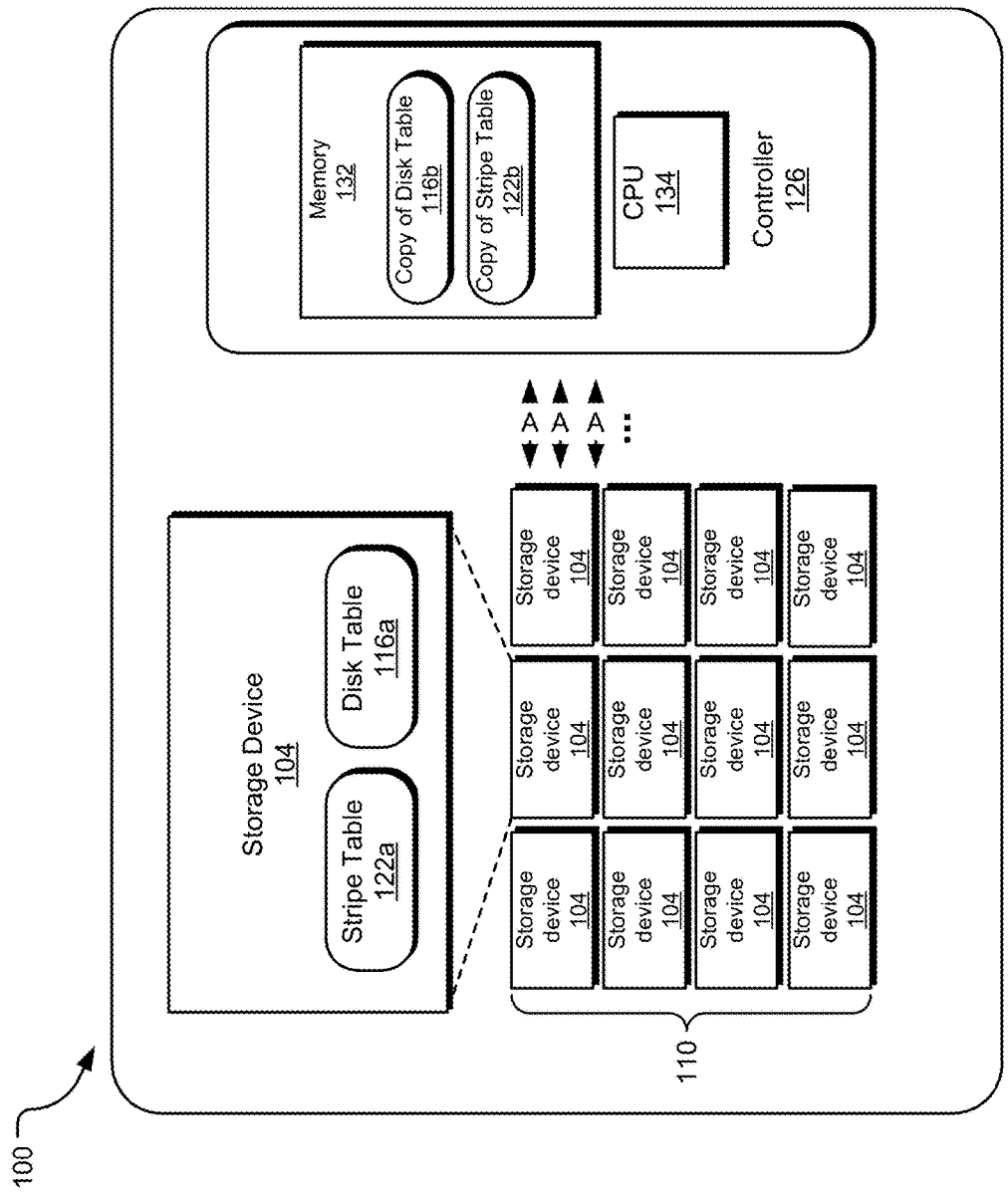
FIG. 1 illustrates an example enclosure system with a controller configured to perform parallel data transfers to an ordered pool of storage devices.

FIG. 1 illustrates an example enclosure system 100 with a controller 126, which includes a CPU 134 and a memory 132 configured to perform parallel data transfers to an ordered pool 110 of storage devices (e.g., storage devices 104), as depicted by the "A" lines. An ordered pool 110 is a group of storage devices whose order is specified by a stripe table.

In some implementations, there may be a minimum of 12 devices 104 in an enclosure system (as shown in FIG. 1). However, any number of devices more than one are contemplated. As used herein, "parallel data transfers" refers to simultaneous transfers of data (e.g., reads or writes of data) along different logical or physical data transmission lines.

The storage devices 104 each encompass non-volatile memory, which may be one or more traditional magnetic disc drives, DRAM, SRAM, MRAM, ferroelectric RAM, magnetic RAM, spin-torque transfer RAM, resistive RAM, 3D cross point solid state memory, etc.

When the storage devices 104 are powered on, the non-volatile memory may serve a variety of purposes, such as to store various tables, metadata, user data, cache data, etc. In FIG. 1, the non-volatile memory stores both a disk table 116a (unique for each storage device) and a stripe table 122a (the same for each storage device) in persistent storage. A separate copy of the disk table 116a ("copy of disk table 116b") is stored in temporary storage in memory 132 in the storage controller 126. Similarly, a copy of the stripe table 122a ("copy of stripe table 122b") is also stored in memory 132 in the storage controller 126.

The stripe table 122a is a data structure used to map stripe zones over the ordered pool 110 of storage devices 104. The stripe table 122a provides information on a stripe layout, which is a layout of an ordered set of drives that each contain a one or more chunks of user data or redundancy information for one or more RAID stripes. The in-memory version of the stripe table 122a is used to determine a stripe layout and map RAID LBA access to location on a storage device 104. The stripe table 122a disperses stripes across all storage devices while still providing a simple mapping of blocks to storage devices. The large number of stripe arrangements provides uniform distribution of I/Os and keeps all the storage devices in operation with each other at the same time.

In some implementations, the mapping information for a stripe zone may be used to determine a disk location using disk tables 116a in the storage devices 104. The disk tables 116a specify the disk location of all incoming host data blocks. In some implementations, there is one disk table 116a in each storage device 104. The disk tables 116a are flexible and provide fast mapping and low latency. The disk tables 116a are based on "chunk zones." Chunk zones are large segments of contiguous data blocks on each storage device. The chunk zones improve sequential performance, manage spare capacity, and simplify mapping.

The controller 126 is configured to divide a body of user data into a plurality of data blocks. Data is transferred from the controller 126 sequentially and written into chunk zones in the ordered pool 110 of multiple different storage devices 104 via parallel data transfers (e.g., "striped"). For example, the data may be split into multiple portions (e.g., data blocks) which are simultaneous exported to the different non-volatile receiving devices.

The division of the user data into different data blocks of logically sequential data allows read back to the controller 126 in case a storage device 104 fails. The data can be combined to re-create the data blocks on a failed storage device 104.

In one implementation, the stripe geometry may include an 8+2 stripe, with a 512 KiB chunk size and a 4 MiB full stripe. The chunk zone size may be 1 GiB, the stripe zone size (based on 8 data drives per stripe) may be 8 GiB, and the maximum pool size may be 128 disks. The controller is responsible for dividing the user data into chunks and calculating and appending redundancy chunks.

In some implementations, the ordered pool 110 (or "first ordered pool," in this example) of storage devices 104 can be expanded by adding additional storage devices 104 to the first ordered pool 110, making a new second ordered pool (not shown), which includes the first ordered pool. The data can be redistributed and written on data blocks across the second ordered pool of storage devices 104. Each of the storage devices 104 will include spare capacity. Mapping for spare capacity may be built into the mapping tables. If a storage device 104 fails, then the controller 126 will reconstruct data for all data blocks on the failed storage device from all the other storage devices 104.

In some implementations, the rebuild can be a partial rebuild. For example, a partial rebuild can occur if there is not enough spare capacity remaining in the disk pool to fully reconstruct all damaged stripe zones. By incorporating spare capacity in the disks, no spare disks are required, and the ordered pool 110 of storage devices 104 are self-healing. Thus, no replacement of failed disks is required.

In some implementations, for example, when two storage devices 104 fail, critical stripe zones can be identified. Critical stripe zones are stripe zones that have lost enough chunk zones that another chunk zone loss cannot be handled without loss of user data. For example, in the 8+2 case, a loss of up to 2 chunk zones is permitted. Losing 3 chunk zones in one stripe zone results in data loss. Data is then reconstructed on the critical stripe zone first before rebuilding the other data blocks effected by the two failed storage devices. The data is rebuilt in the spare capacity of all the other storage devices 104. As provided above, in some implementations, the method includes a partial rebuild.

The controller 126 includes software and/or hardware, and may be implemented in any tangible computer-readable storage media within or communicatively coupled to the data storage device 100. As used herein, the term "tangible computer-readable storage media" includes, but is not limited to, RAM, ReRAM, MRAM, flash memory or other memory technology, and other solid state storage class memory or other optical disk storage, magnetic cassettes, magnetic tape, magnetic disk storage or other magnetic storage devices, or any other tangible medium which can be used to store the desired information and which can be accessed by a mobile device or computer. In contrast to tangible computer-readable storage media, intangible computer-readable communication signals may embody computer readable instructions, data structures, program modules or other data resident in a modulated data signal, such as a carrier wave or other signal transport mechanism.

Figure 2:
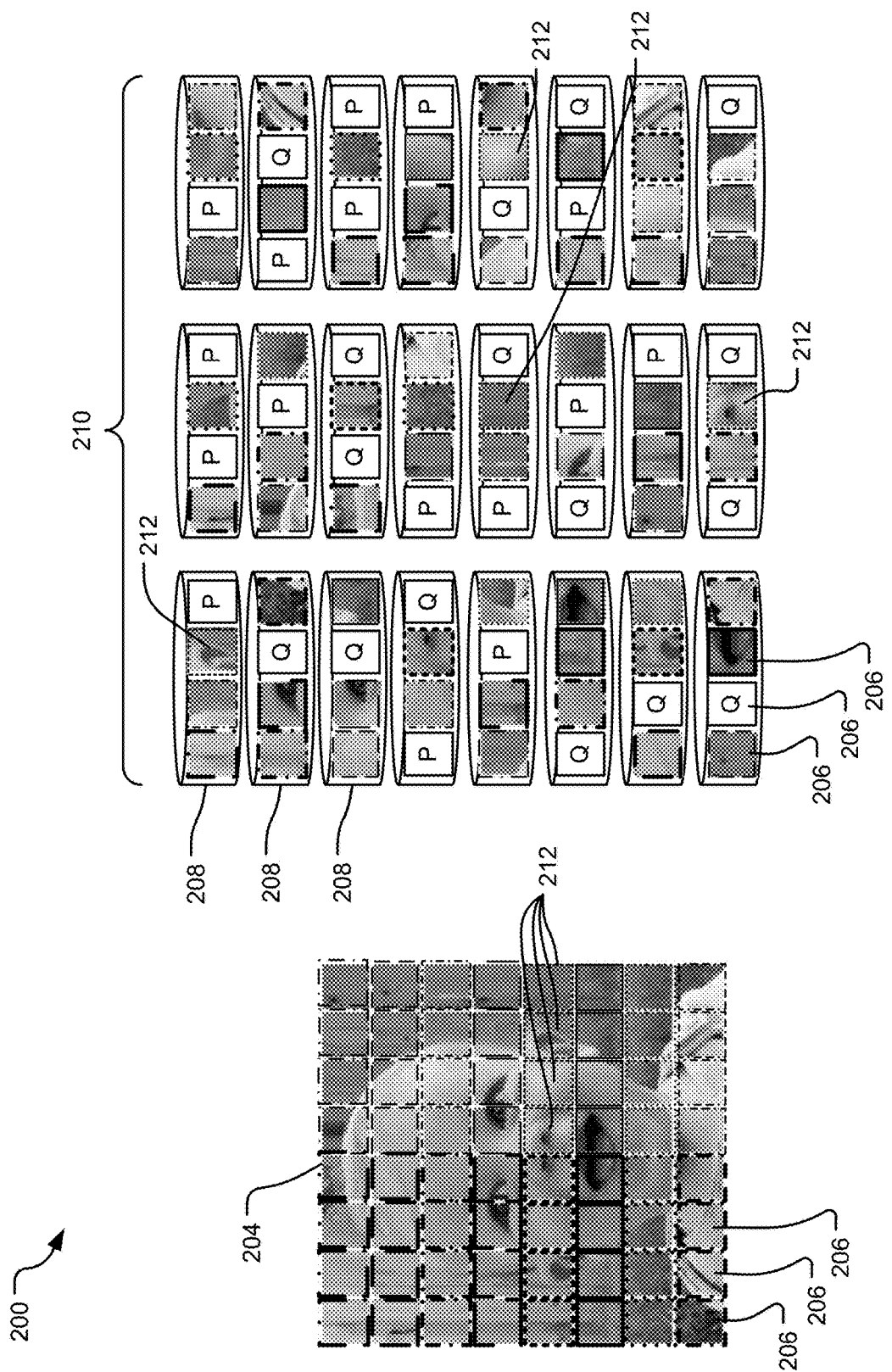
FIG. 2 illustrates a schematic diagram of writing to an ordered pool of storage devices.

FIG. 2 illustrates a schematic diagram 200 of writing to an ordered pool 210 of multiple storage devices (e.g., 24 storage devices 208). A file 204 (e.g., a jpeg) is shown, made up of multiple data blocks 206. The data in the data blocks 206 may be transferred from the file 204 in parallel streams to the ordered pool 210 of storage devices 208.

For example, the four data blocks 212 may be transferred in parallel to the storage devices. The data may be transferred in stripes, including parity blocks (e.g., 4+2). For example, the parity blocks in the ordered pool as depicted with the letters "P" and "Q." Data is separated into chunks (represented by each small square in FIG. 2). The chunks are arranged into stripes (4 chunks in this case) and redundancy information (called P and Q) is generated by the controller. In one implementation P and Q are generated by the even-odd RAID 6 algorithm.

In another implementations, P and Q are generated by Reed Solomon codes. Data is separated into chunks (represented by each small square in FIG. 2). The chunks are arranged into stripes (4 chunks in this case) and redundancy information (called P and Q) is generated by the controller. In one implementation P and Q are generated by the even-odd RAID 6 algorithm. In another embodiment, P and Q are generated by Reed Solomon codes.

Figure 3:
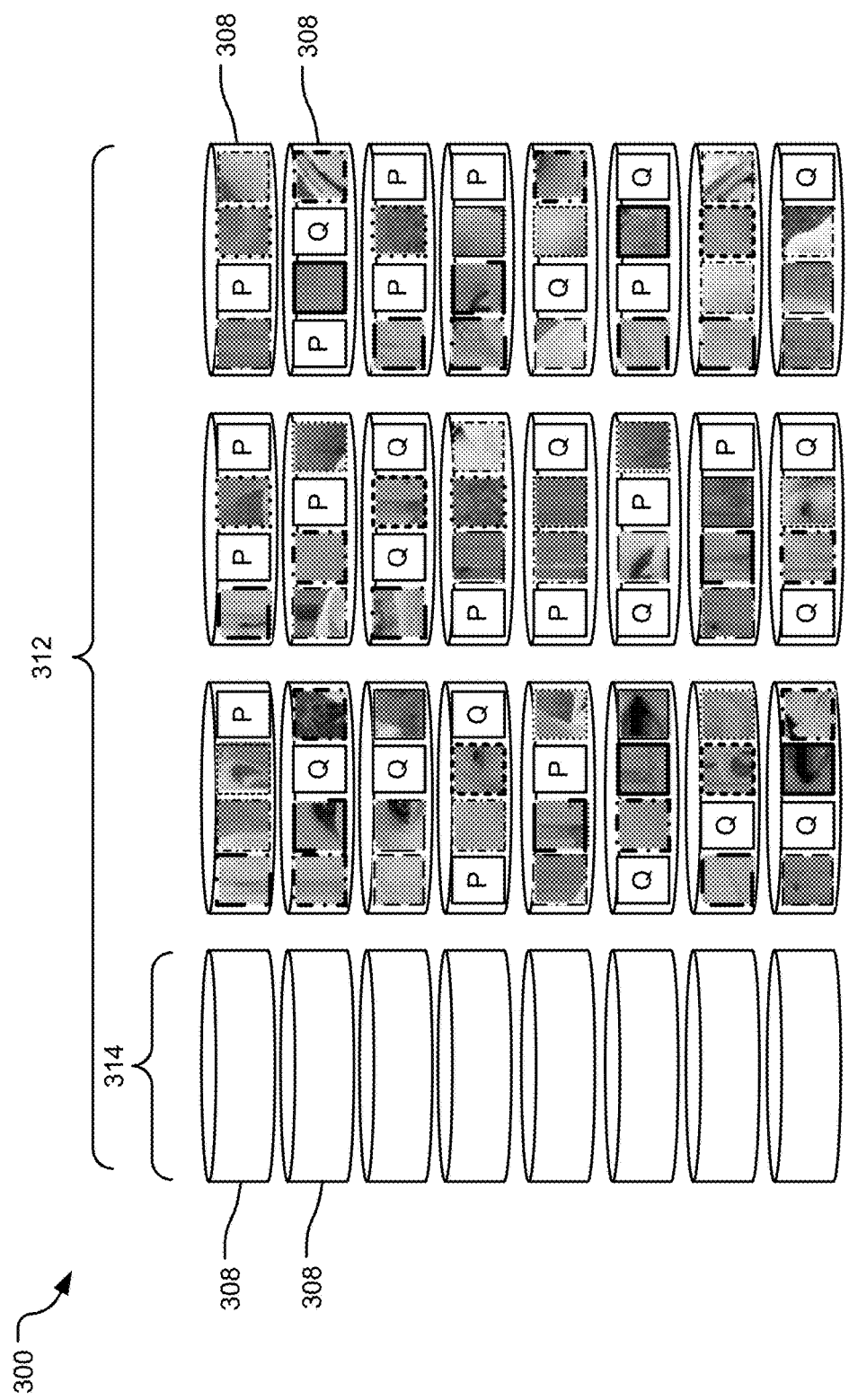
FIG. 3 illustrates a schematic diagram of expanding an ordered pool of storage devices.

FIG. 3 illustrates a schematic diagram 300 of expanding a first ordered pool 310 of storage devices (e.g., storage devices 308). As shown, a pool 312 of eight additional storage devices 308 in a pool 314 are added to the first ordered pool 310 of storage devices 308 making a second ordered pool, including the first ordered pool. Additional devices may be added to the second ordered pool at any time additional storage capacity is required. Additionally, devices can be added to replenish spare capacity used by other device failures.

Figure 4:
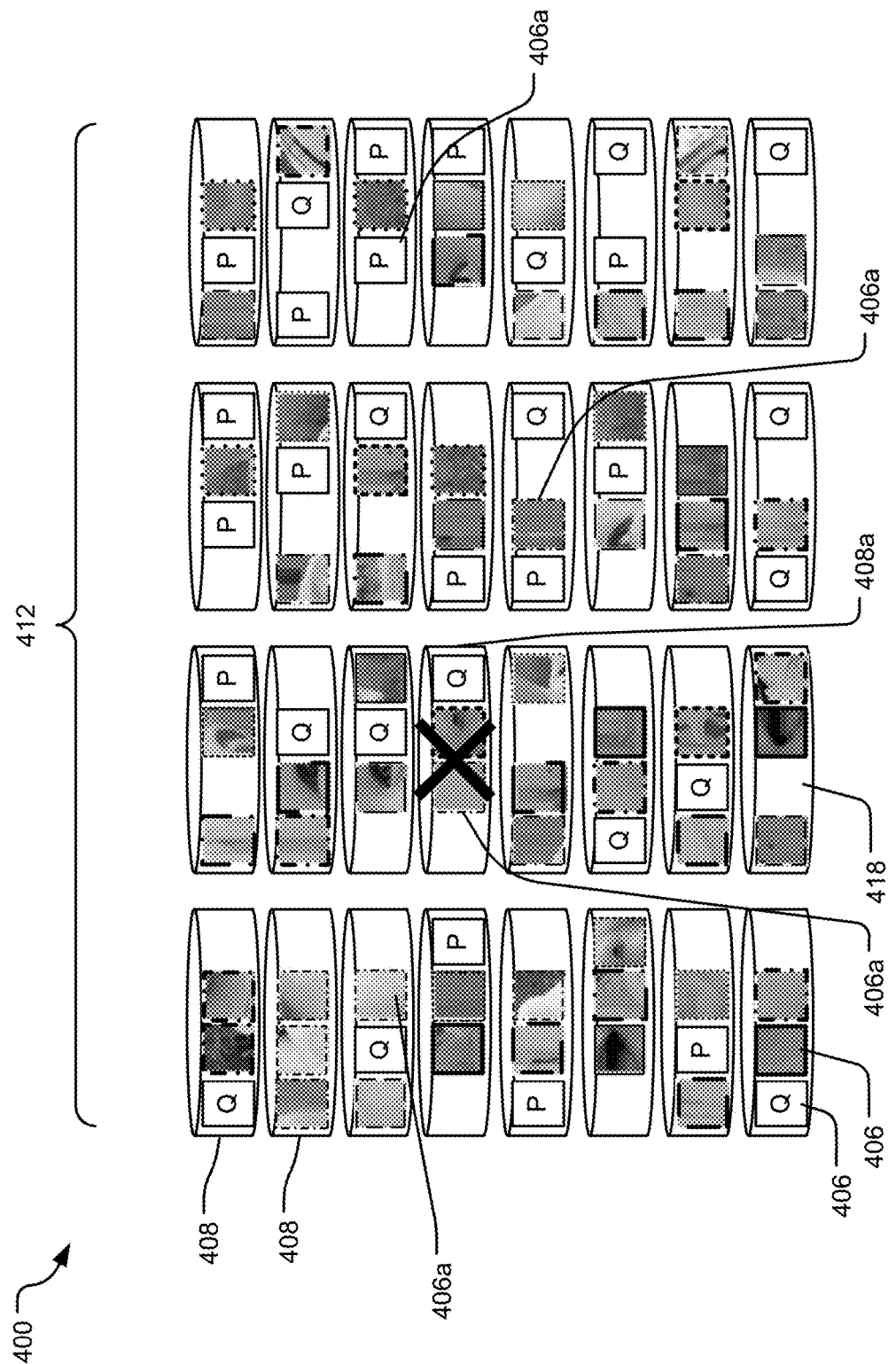
FIG. 4 illustrates a schematic diagram of redistributing data blocks across an expanded pool of storage devices.

FIG. 4 illustrates a schematic diagram 400 of redistributing the data blocks across a new expanded pool 412 of storage devices 408. The data blocks 406 are scattered evenly across the new expanded pool 412 (e.g., 32 storage devices 408). Each of the storage devices 408 may include spare capacity, as depicted in sector 418.

If a storage device 408 fails, then a controller (not shown) will seek data for all data blocks on the failed storage device from all the other storage devices 408. In some implementations, the rebuild can be a partial rebuild.

In some implementations, for example, when two storage devices fail, a critical stripe zone can be identified. Data is then reconstructed on the critical stripe zone first before rebuilding the other data blocks on the two failed storage devices. The data is rebuilt in the spare capacity of all the other storage devices. As provided above, in some implementations, the method includes a partial rebuild.

Figure 5:
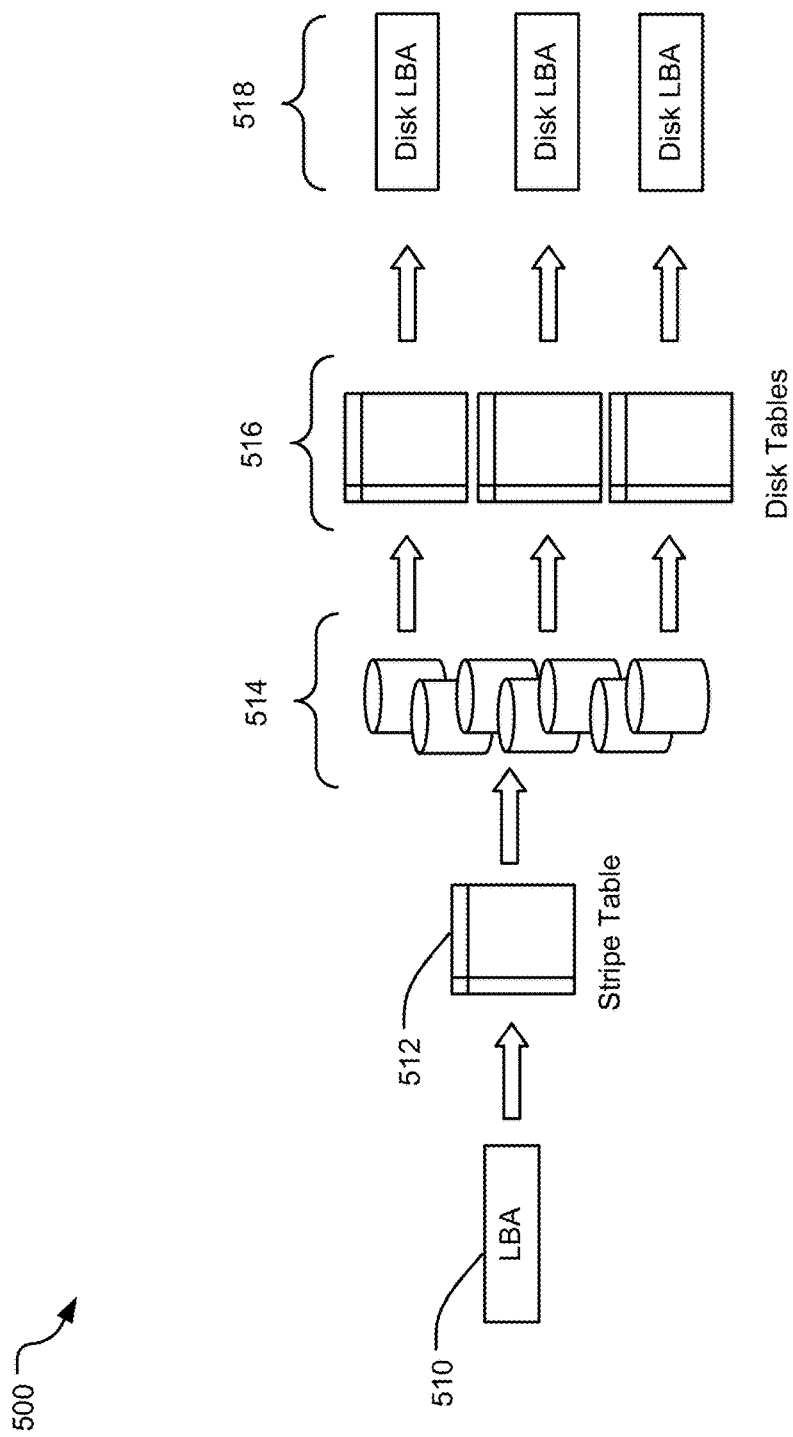
FIG. 5 illustrates a schematic diagram of an example LBA mapping system.

FIG. 5 illustrates a schematic diagram 500 of an example LBA mapping system in the disclosed technology. In some implementations, the mapping is table-based. In some implementations, the stripe table and the disk tables may be combined into a single unified table in volatile memory. In some implementations, the stripe table and the disk tables may be combined into a single unified table stored on each of the devices.

For example, LBA 510 is shown to represent an extent of data (e.g., an incoming write request). A Stripe Table 512 provides which of a plurality of Storage Devices 514 will the data for the incoming write request be located. The Stripe Table 512 may be located in memory on a storage device.

As shown in FIG. 5, there are seven Storage Devices 514. Three of the Storage Devices 514 are shaded to depict that the data for the incoming request will be written on the three shaded Storage Devices 514.

In some implementations, there may be Disk Tables 516 located on each of the Storage Devices 514. The Disk Tables 516 provide where on each of the three shaded Storage Devices 514 the data will be written, resulting in Disk LBA 518.

Figure 6:
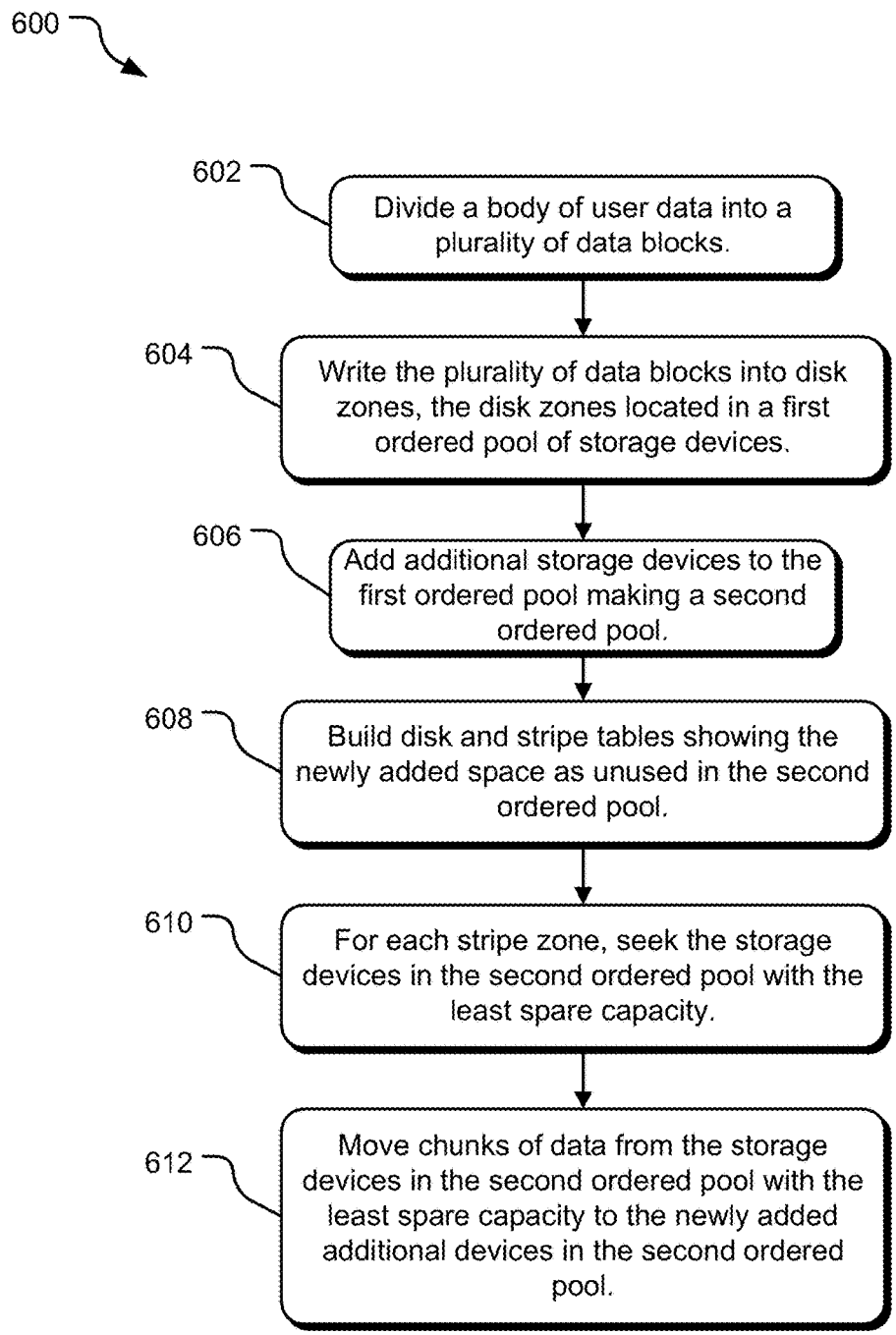
FIG. 6 illustrates a flow chart of example operations of adding storage to an ordered pool of storage devices.

FIG. 6 illustrates a flow chart of example operations 600 of adding storage to a first ordered pool of storage devices. An operation 602 divides a body of user data into a plurality of data blocks. An operation 604 writes the plurality of data blocks into chunk zones. The chunk zones are located in a first ordered pool of storage devices.

An operation 606 adds additional storage devices to the first ordered pool to make a second ordered pool. An operation 608 builds disk tables and stripe tables showing newly added spaced as unused in the second ordered pool. An operation 610 seeks the storage devices in the second ordered pool with the least spare capacity. An operation 612 moves chunks of data from the storage devices in the second ordered pool with the least spare capacity to the newly added additional storage devices.

Adding storage devices to an existing pool allows two things to be done: 1) expansion (or replenishment) of spare capacity; and 2) expansion of usable capacity. In general, adding new storage devices requires a rebalance operation to be started. This operation (or "utility") attempts to evenly distribute used chunk zones across all storage devices.

In some implementations, rebalance moves chunk zones from the first ordered pool to the new storage devices so as to equally distribute spare capacity across all storage devices. In some implementations, the rebalance utility may move chunk zones to equally distribute used capacity across all storage devices.

One of the key requirements of moving chunk zones within ordered pool is that stripe zone fault tolerance must be maintained. This means that each chunk zone in the stripe zone must be on a separate storage device. This allows failure of a single storage device to only cause loss of at most one chunk zone per stripe zone.

Expansion of usable capacity involves creating new stripe zones out of previously spare chunk zones. It is apparent that the requirements of maintaining fault tolerance may require rebalance to run (at least partially) before usable space expansion occurs. In some implementations, the system may allow incremental usable capacity expansion intermixed with rebalance. In some implementations, the system may run rebalance to its conclusion before usable capacity expansion. Other implementations may only expand spare capacity.

In some implementations, any loss of fault tolerance (e.g. full or partial loss of data in a storage device) during a rebalance operation will immediately cause the rebalance operation to stop, and a rebuild operation to start.

Figure 7:
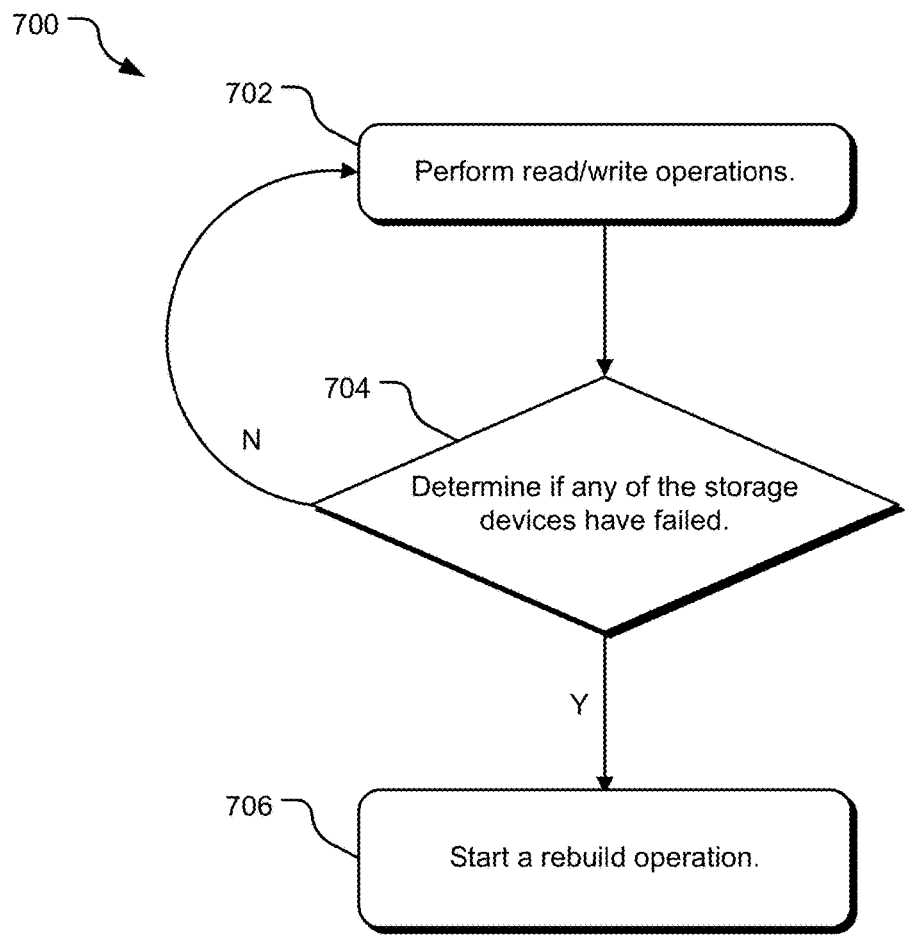
FIG. 7 illustrates a flow chart of example operations of rebuilding data.

FIG. 7 illustrates a flow chart of example operations 700 of rebuilding data. An operation 702 performs read/write operations. An operation 704 determines whether one or more of the storage devices has failed. If no storage device has failed, read/write operations continue in operation 702.

If one or more of the storage devices has failed, an operation 706 starts a rebuild operation. The rebuild operation rebuilds the data from all the data blocks on the failed storage device in the spare capacity of all the other storage devices. Stripes are rebuilt by performing a standard RAID recovery techniques on the remaining chunks in the stripe. The remaining chunks in the stripe are identified by the stripe and disk tables. Once a data chunk has been reconstructed, it is rewritten to an available spare chunk that meets the fault tolerance requirements of the stripe. No two chunks from a stripe are on the same storage device.

In some implementations, the method includes a partial rebuild. In some implementations, the rebuild may be table-based. For example, mapping to a stripe layout of data on the storage devices may be performed with a stripe table to rebuild the data. The stripe layout can provide which storage devices contain the required data. Disk tables on the determined storage devices can provide mapping to specific locations (chunk zones) on the storage devices.

Figure 8:
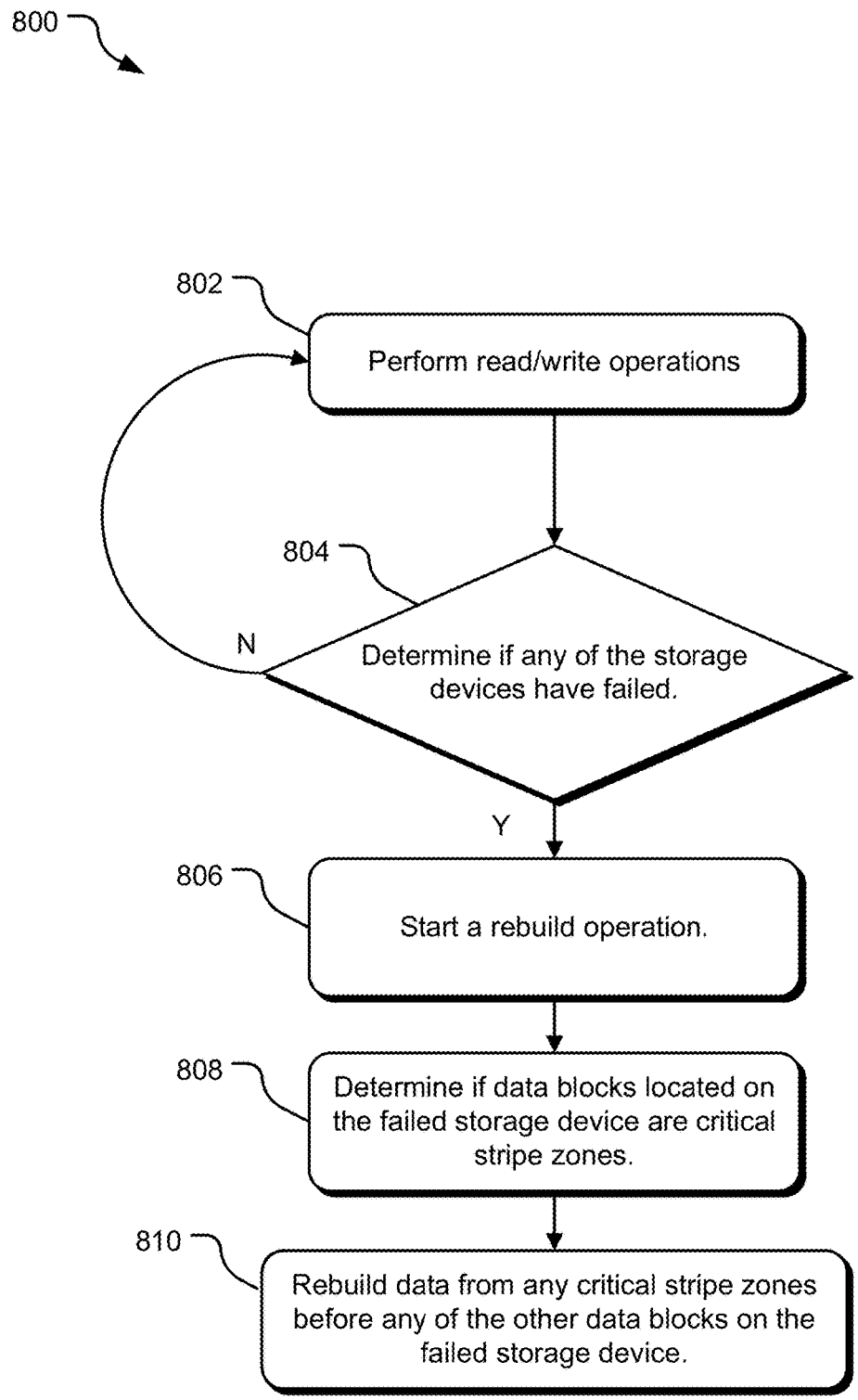
FIG. 8 illustrates a second flow chart of example operations of rebuilding data.

FIG. 8 illustrates a flow chart of example operations 800 of rebuilding data. An operation 802 performs read/write operations. An operation 804 determines if any of the storage devices have failed. If none of the storage devices have failed, read/write operations continue in operation 802.

If one or more of the storage devices has failed, an operation 806 starts a rebuild operation. An operation 808 iterates through all the stripe zones, and determines first which, if any, of the stripes zones (or data blocks) located on a failed storage device are critical stripe zones. The term "critical" may be defined as unable to continue operating if another chunk of data is lost. For example, critical stripe zones may be critical stripes that are missing two data chunks.

If any of the data blocks located on the failed storage device are critical stripe zones, an operation 810 rebuilds data from any critical stripe zones before any of the other data blocks on the failed storage device. Stripes are rebuilt by performing a standard RAID recovery techniques on the remaining chunks in the stripe. The remaining chunks in the stripe are identified by the stripe and disk tables. Once a data chunk has been reconstructed, it is rewritten to an available spare chunk that meets the fault tolerance requirements of the stripe. No two chunks from a stripe are on the same storage device.

In one implementation, example operations 800 of rebuilding data from critical stripe zones first can either fix one or more damages chunks in the critical stripe. After the critical stripes have all been processed (either partially or completely repaired) then the stripes are again all processed, fixing all degraded stripes.

The implementations described herein may be implemented as logical steps in one or more computer systems. The logical operations of the various implementations described herein are implemented (1) as a sequence of processor-implemented steps executing in one or more computer systems and (2) as interconnected machine or circuit modules within one or more computer systems. The implementation is a matter of choice, dependent on the performance requirements of the computer system. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

In the interest of clarity, not all of the routine functions of the implementations described herein are shown and described. It will be appreciated that in the development of any such actual implementation, numerous implementation-specific decisions are made in order to achieve the developer's specific goals, such as compliance with application— and business-related constraints, and that those specific goals will vary from one implementation to another and from one developer to another.

The above specification, examples, and data provide a complete description of the structure and use of example implementations. Because many alternate implementations can be made without departing from the spirit and scope of the invention, the invention resides in the claims hereinafter appended. Furthermore, structural features of the different implementations may be combined in yet another implementation without departing from the recited claims.

What is claimed is:

1. A method comprising:
dividing a body of user data into a plurality of data blocks;
writing the plurality of data blocks into chunk zones, the chunk zones located in a first ordered pool of storage devices;
adding additional storage devices to the first ordered pool to make a second ordered pool;
determining that a storage device in the second ordered pool has failed; and
determining with a table which chunk zones of spare capacity of other storage devices in the second ordered pool to use for writing the plurality of data blocks of the failed storage device for a partial rebuild of the data for the data blocks on the failed storage device.

2. The method of claim 1, further comprising:
transferring data in parallel streams between a memory in a controller and the storage devices in the first ordered pool.

3. The method of claim 2, further comprising:
redistributing data from the storage devices in the first ordered pool to the storage devices in the second ordered pool; and
writing the plurality of data blocks evenly across the second ordered pool of storage devices, such that each of the storage devices in the second ordered pool include spare capacity that at least partially comprises the spare capacity of the other storage devices in the second ordered pool.

4. The method of claim 3, further comprising:
determining that two of the storage devices in the second ordered pool have failed;
determining that one of the data blocks located on the two failed storage devices is a critical stripe zone; and
rebuilding the data of the critical stripe zone in the spare capacity of the other storage devices in the second ordered pool before rebuilding other data blocks in the two failed storage devices.

5. The method of claim 2, further comprising:
seeking data for the data blocks on the failed storage device from one or more of the other storage devices in the second ordered pool.

6. The method of claim 5, further comprising:
rebuilding the data for the data blocks on the failed storage device from the other storage devices in the second ordered pool in the spare capacity of the other storage devices in the second ordered pool.

7. The method of claim 6, wherein rebuilding the data for the data blocks on the failed storage device in the spare capacity of the other storage devices in the second ordered pool includes the partial rebuild.

8. The method of claim 7, further comprising determining which chunk zone to use on each storage device with the table comprising a disk table based on the determined stripe layout.

9. The method of claim 6, further comprising mapping to a stripe layout with a stripe table to rebuild the data.

10. A storage system comprising:
at least two disparate storage devices in a first ordered pool configured to receive data in parallel data streams;
a storage system controller configured to:
divide a body of user data into a plurality of data blocks;
redistribute the plurality of data blocks across the storage devices in the first ordered pool, such that each of the storage devices including spare capacity;
determine that one of the plurality of storage devices in the first ordered pool has failed; and
seek data for the data blocks on the failed storage device from one or more of the other storage devices in the first ordered pool; and
a disk table located in each storage device configured to determine which chunk zone to use on each storage device for redistributing the plurality of data blocks.

11. The storage system of claim 10, wherein the storage device controller is further configured to:
add additional storage devices to the first ordered pool to make a second ordered pool, including the first ordered pool; and
write the plurality of data blocks to the storage devices in the second ordered pool, such that each of the storage devices in the second ordered pool including spare capacity.

12. The storage system of claim 11, wherein the storage device controller is further configured to:
determine that one or more of the storage devices in the second ordered pool has failed; and
seek data for the data blocks on the failed storage device from of the other storage devices in the second ordered pool.

13. The storage system of claim 12, wherein the storage device controller is further configured to:
rebuild the data from the data blocks on the failed storage device in the spare capacity of the other storage devices in the second ordered pool.

14. The storage system of claim 13, wherein the storage device controller is further configured to:
determine that two of the storage devices in the second ordered pool have failed;

determine that one of the data blocks located on the two failed storage device is a critical stripe zone; and rebuild the data of the critical stripe zone in the spare capacity of the other storage devices in the second ordered pool.

15. The storage system of claim 11, further comprising a stripe table configured to provide mapping to a stripe layout.

16. The storage system of claim 15, wherein the disk table located in each storage device is configured to determine which chunk zone to use on each storage device based on the stripe layout.

17. One or more tangible computer-readable storage media encoding computer-executable instructions for executing on a computer system a computer process, the computer process comprising:

dividing a body of user data into a plurality of data blocks;

writing the plurality of data blocks into chunk zones in parallel streams, the chunk zones located in a first ordered pool of storage devices;

determining that one or more of the storage devices in the first ordered pool has failed;

seeking data for the data blocks on the failed storage device from of the other storage devices in the first ordered pool;

determining a stripe layout with a unified table comprising a combination of a stripe table and disk tables for the storage devices;

determining which chunk zone to use for writing the plurality of data blocks on each storage device with the unified table based on the determined stripe layout.

18. The one or more tangible computer-readable storage media of claim 17, the computer process comprising:

adding additional storage devices to the first ordered pool making a second ordered pool, including the first ordered pool; and writing the plurality of data blocks across the second ordered pool of storage devices, each of the storage devices in the second ordered pool of storage devices including spare capacity.

19. The one or more tangible computer-readable storage media of claim 18, the computer process further comprising:

rebuilding the data from the data blocks on the failed storage device in the spare capacity of the other storage devices in the second ordered pool of storage devices.

20. The one or more tangible computer-readable storage media of claim 19, the computer process comprising:

determining that two of the storage devices in the second ordered pool of storage devices have failed;

determining that one of the data blocks located on the two failed storage devices is a critical stripe zone; and rebuilding the data of the critical stripe zone in the spare capacity of the other storage devices in the second ordered pool of storage devices before rebuilding other data blocks in the two failed storage devices.

* * * * *